Figure 1:
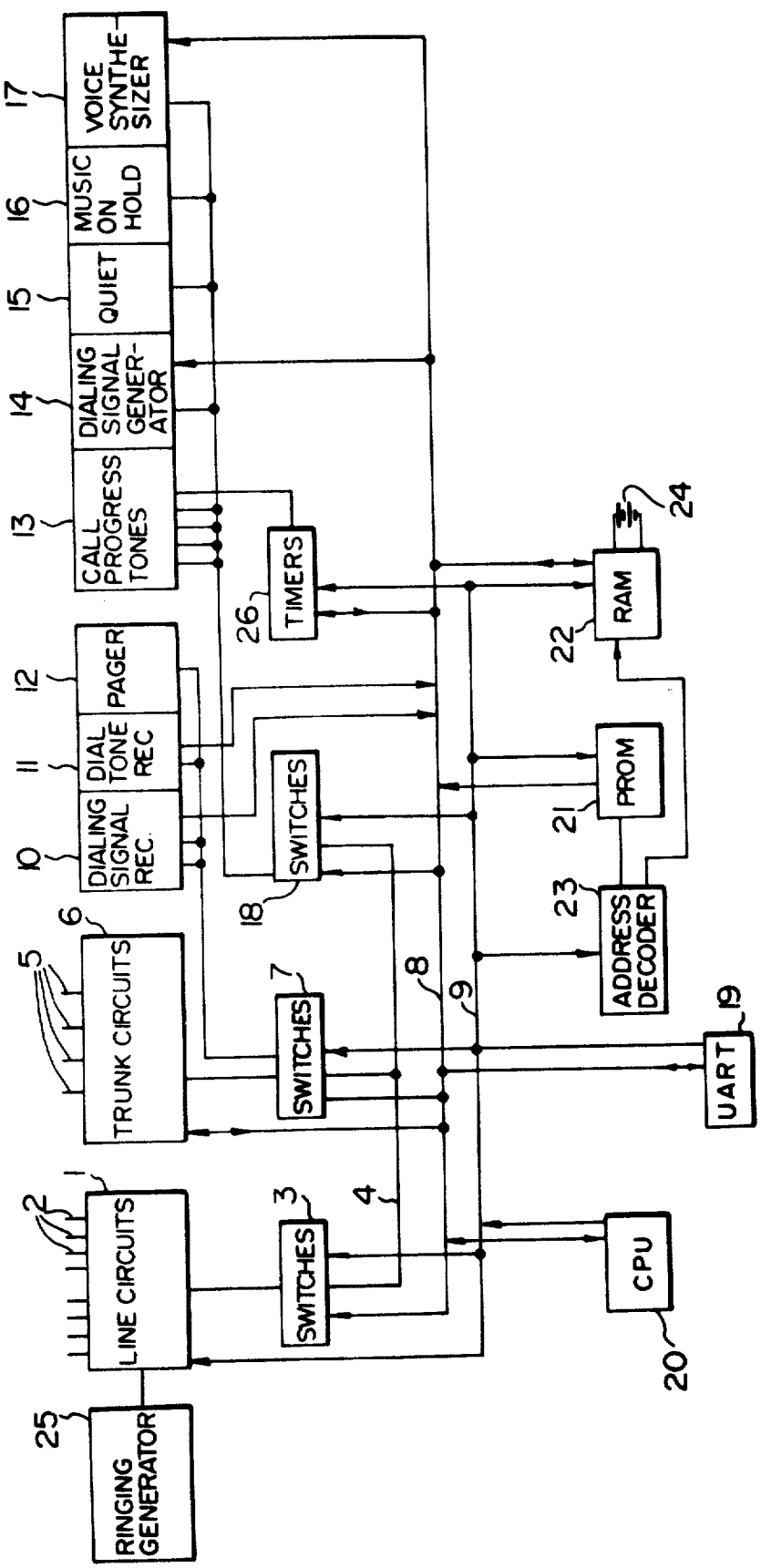

United States Patent [19]

Beirne

[11] 4,376,875
[45] Mar. 15, 1983

[54] KEYLESS AND INDICATORLESS LOCAL TELEPHONE SWITCHING SYSTEM

[75] Inventor: Patrick R. Beirne, Stittsville, Canada

[73] Assignee: Mitel Corporation, Ontario, Canada

[21] Appl. No.: 205,255

[22] Filed: Nov. 10, 1980

[30] Foreign Application Priority Data

May 16, 1980 [CA] Canada .................................. 352147

[51] Int. Cl.³ ............................................. H04M 3/42
[52] U.S. Cl. ........................... 179/18 B; 179/18 AD; 179/99 H
[58] Field of Search ............... 179/18 AD, 18 B, 99 P, 179/99 R, 6.08, 6.01, 15 M, 18 BF, 18 BD, 18 D, 27 FB, 27 FH, 27 FG, 99 H; 370/62

[56] References Cited

U.S. PATENT DOCUMENTS

| | | | |
|---|---|---|---|
| 3,488,751 | 1/1970 | Gerke et al. | 179/18 BD |
| 3,725,599 | 4/1973 | Krock et al. | 179/18 BD |
| 3,737,587 | 6/1973 | Romero | 179/18 B |
| 4,022,983 | 5/1977 | Braun et al. | 179/18 B |
| 4,028,498 | 6/1977 | Mehaffey et al. | 179/18 GE |
| 4,059,734 | 11/1977 | Vanderbusse | 179/18 BD |
| 4,100,375 | 7/1978 | Noller | 179/2 A |
| 4,255,618 | 3/1981 | Danner et al. | 179/1 B |
| 4,277,649 | 7/1981 | Sheinbein | 179/18 B |
| 4,291,199 | 9/1981 | Densmore et al. | 179/18 AB |

FOREIGN PATENT DOCUMENTS

| | | | |
|---|---|---|---|
| 1276749 | 9/1968 | Fed. Rep. of Germany | 179/18 BD |
| 2439447 | 2/1976 | Fed. Rep. of Germany | 179/18 AD |
| 2758775 | 1/1979 | Fed. Rep. of Germany | 179/18 AD |
| 47-9046 | 3/1972 | Japan | 179/18 BD |

OTHER PUBLICATIONS

"New Telephone Service", by M. Murata et al., *Japan Telecommunications Review*, vol. 22, No. 2, Apr. 1980, pp. 107–111.
"Electronic PABX at Credit Lyonnois in Paris", Y. Guiberteau, *Ericsson Review*, No. 1, 1976.
"The K1 PABX", J. C. H. Davis, *Systems Technology*, No. 28, Apr. 1978.

*Primary Examiner*—Thomas W. Brown
*Attorney, Agent, or Firm*—Laff, Whitesel, Conte & Saret

[57] ABSTRACT

A telephone switching system for interconnection of a plurality of lines with a number of trunks in which telephone sets having no trunk access pushbuttons can access particular trunks upon command. Upon initiating a command signal, i.e. by a subscriber dialing particular access codes, the switching system provides a voiced enunciation of the number of an idle trunk or the number of which trunk is on "hold". The subscriber can then dial the trunk number followed by the number of an outgoing call, or an access code followed by the held trunk number whereby the line is connected to the particular accessed trunk. The system is comprised of a control system, apparatus for connecting a plurality of subscriber's lines to the control system, apparatus for connecting a plurality of trunks to the control system, a junctor system for interconnecting subscribers' lines and trunks under control of the control system, a voice announcement system connected to the control system, apparatus for connecting the voice announcement system to the junctor system upon receipt by the control system of a command signal from a line connected to a subscriber's set, and for enabling the generation of a predetermined announcement and applying it to the line in response thereto, which is designative of an idle or held trunk. The system thus provides the featues of a key telephone system without the requirement for use of multi-button key telephone sets and can also provide features normally associated with a PABX to such subscribers, while eliminating the requirement for an operator's console normally associated with a PABX.

11 Claims, 10 Drawing Figures

KEYLESS AND INDICATORLESS LOCAL TELEPHONE SWITCHING SYSTEM

This invention relates to a multiple central office line local telephone switching system such as a PABX or key telephone system having no line busy visual indicators or keys.

Local telephone switching systems which are usually located on a business premises are generally of two types: key telephone systems and PABXs. Key telephone systems typically have a number of lines each accessible from a number of telephone station sets. Each set has a plurality of keys or switches, one of each accessing a corresponding line. When a key is depressed, giving access of a telephone to the line corresponding to the key, it illuminates on the local telephone set and on all others, warning others that the line is in use. A user can of course gain access to a line which is indicated as being busy by depressing an illuminated key. Usually key systems do not have a wide variety of different kinds of services provided.

Another form of local switching system is a PABX. In this case a plurality of lines terminate in a control console, a plurality of telephone sets being connected to the PABX. Upon a particular trunk or line being busy, a corresponding indicator light usually is illuminated on the control console, and complete control of switch through of a trunk to a telephone set is under control of an operator such as a human or automatic control system, operating the control console. Often a large variety o different kinds of services is available with PABX services.

In the key telephone system, the telephone sets which are used are clearly more expensive than keyless type telephone sets as are used in conjunction with PABXs, and key telephone systems, being relatively unsophisticated, have in the main provided only limited forms of option services. Yet in a PABX system, an operator must be used to control the system.

The present invention is a local telephone switching system for interconnecting a plurality of subscribers' telephone sets and a plurality of central office lines or trunks, in which neither an operator, operator console, nor telephone sets with keys or visual indicator indicia are needed. Accordingly only the most inexpensive standard telephone sets need be utilized, and privacy is maintained as to which trunks, and how many are in use at any given time. Yet any of the local telephone sets can have access to any of the central office lines when desired, in order to either initiate outgoing calls, or to answer incoming calls.

Yet the local telephone switching system can provide a variety of different kins of optional services, such as call forwarding, camp-on, call back, transfer, consultation, etc.

According to the present invention, when an incoming call is received and rings the local telephone system, it can be answered by any local telephone set. The answering party, recognizing that the call is for someone else, asks the called party to hold the line, then flashes his switchhook. The controller of the system, recognizing the switchhook flash, places the calling line on hold and enables a voice synthesizer which provides a voiced enunciation of the line number of the incoming call, for instance "line 3". This voiced enunciation is received only by the telephone set which initiated the hook switch flash, and not the calling party. As a result, the party answering the telephone knows what line the incoming call is on.

In the alternative, after the switchook flash, dial tone is returned to the answering party. The answering party then dials a "hold" command, e.g. a number "6", and the voice announcement is generated. Such systems are normally used, in small offices in which various parties are within earshot of each other. The answering party thus calls to the intended recipient of the call, to "take line 3", and he hangs up his handset. In the alternative, the answering party could have dialled a predetermined number to access a paging amplifier, and paged the intended recipient of the call to take line 3.

The intended recipient of the call then lifts his handset, dials the line number, and this is recognized by the controller to connect the telephone set to the line on hold, of course removing the hold from the line. The two parties can now engage their conversation.

For outgoing calls, a subscriber need only dial a predetermined access number followed by the line number as described below. This is recognized by the local control, which connects the local subscriber with an outgoing line.

For the subscriber to determine which line he should access, he need merely dial the access number. The switching system controller, recognizing this signal, determines the lowest numbered idle line and enables the voice synthesizer to enunciate the line number, which is returned to the local subscriber. The local subscriber then dials the line number (a one digit number), and gains access to the central office line. Dial tone is returned to him, and he can dial an outgoing number.

In the alternative, rather than enabling the voice synthesizer, the controller could connect an idle line, as automatically selected, to the local subscriber's telephone set.

Clearly the use of a voice synthesizer which is enabled by the local controller removes the requirement for key sets, line busy visual indicators, and an operator console for a local switching system. Thus the present invention forms a new class of local switching systems, being neither a PABX or key telephone system.

While key systems are usually connected to central offices via central office lines, and PABX's are connected to central offices via trunks, in this specification such lines and trunks are interchangeable, and are referred to as equivalents.

In general, the invention is a telephone switching system comprising a control system, means for connecting a plurality of lines adapted to be connected to subscribers' sets to the control system, circuitry for connecting the plurality of trunks to the control system, a set of junctors for interconnecting lines and trunks under control of the control system, a voice announcement system connected to the control system, and circuitry for connecting the voice announcement system to a junctor connected to a line upon receipt by the control system of a command signal from the line, and for enabling the generation of a predetermined signal for application to the line. Preferably the voice announcement designates a trunk to which the line or another line can be connected upon receipt of a further command signal.

According to a preferred embodiment of the invention, the telephone switching system is comprised of a plurality of line circuits, a plurality of trunk circuits, and a plurality of junctors for interconnecting the line and trunk circuits. The system includes a data bus and an address bus. A plurality of switches are connected between the line circuits and the junctor circuits, and the trunk circuits and the junctors, and also are connected circuits, trunk circuits and junctors and the data and address buses. At least one dialling signal receiver is connected via further switches to the junctors, which are also connected to the data bus. A voice synthesizer provides signals comprising the voiced enunciation of trunk numbers via still further switches to the junctors, and to the data bus. A control circuit connected to the data and address buses is provided for operating the switches and interconnecting the lines and trunks, and for enabling operation of the voice synthesizer to apply a voiced representation of the designation of a predetermined trunk to a junctor for transmission via a line circuit to a subscriber's set connector thereto. Of course other circuits such as dial tone circuits and ringing circuits are also used in a complete system, as will be described in detail later.

While the present description refers to a voice synthesizer, other means for providing enunciated announcements of line numbers, such as prerecorded tapes, etc, can be used.

Figure 2:
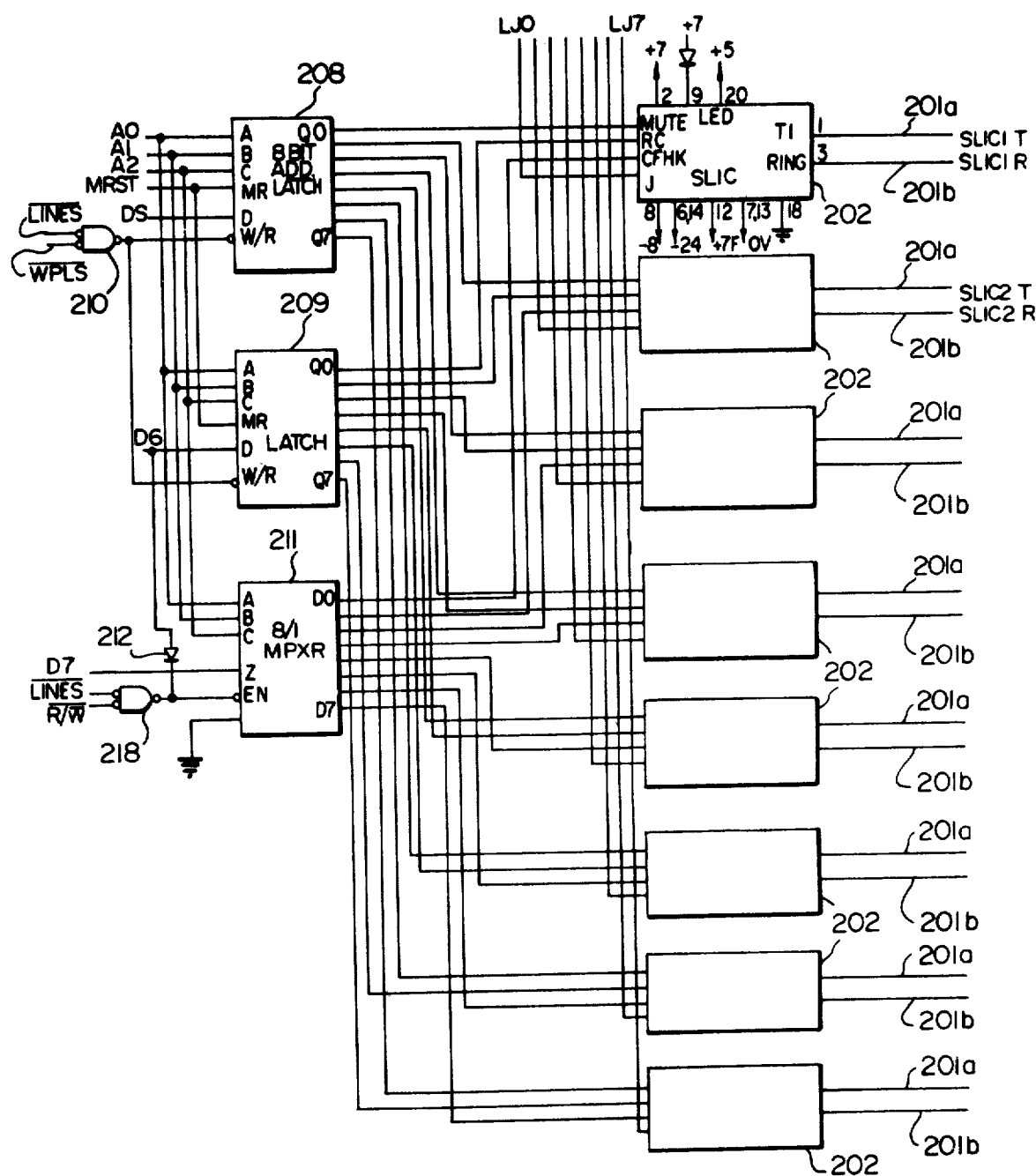
Figure 3A:
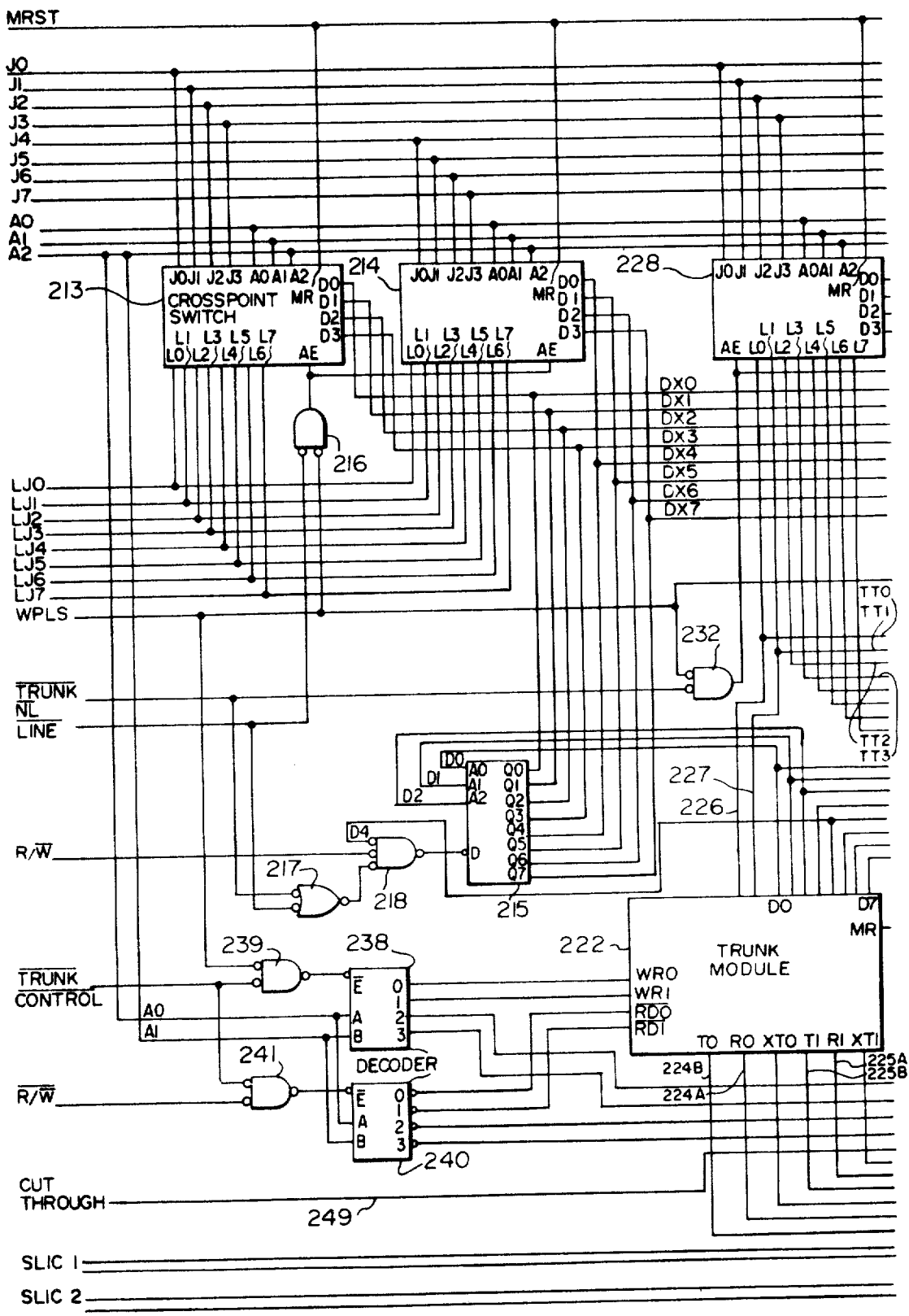
Figure 3B:
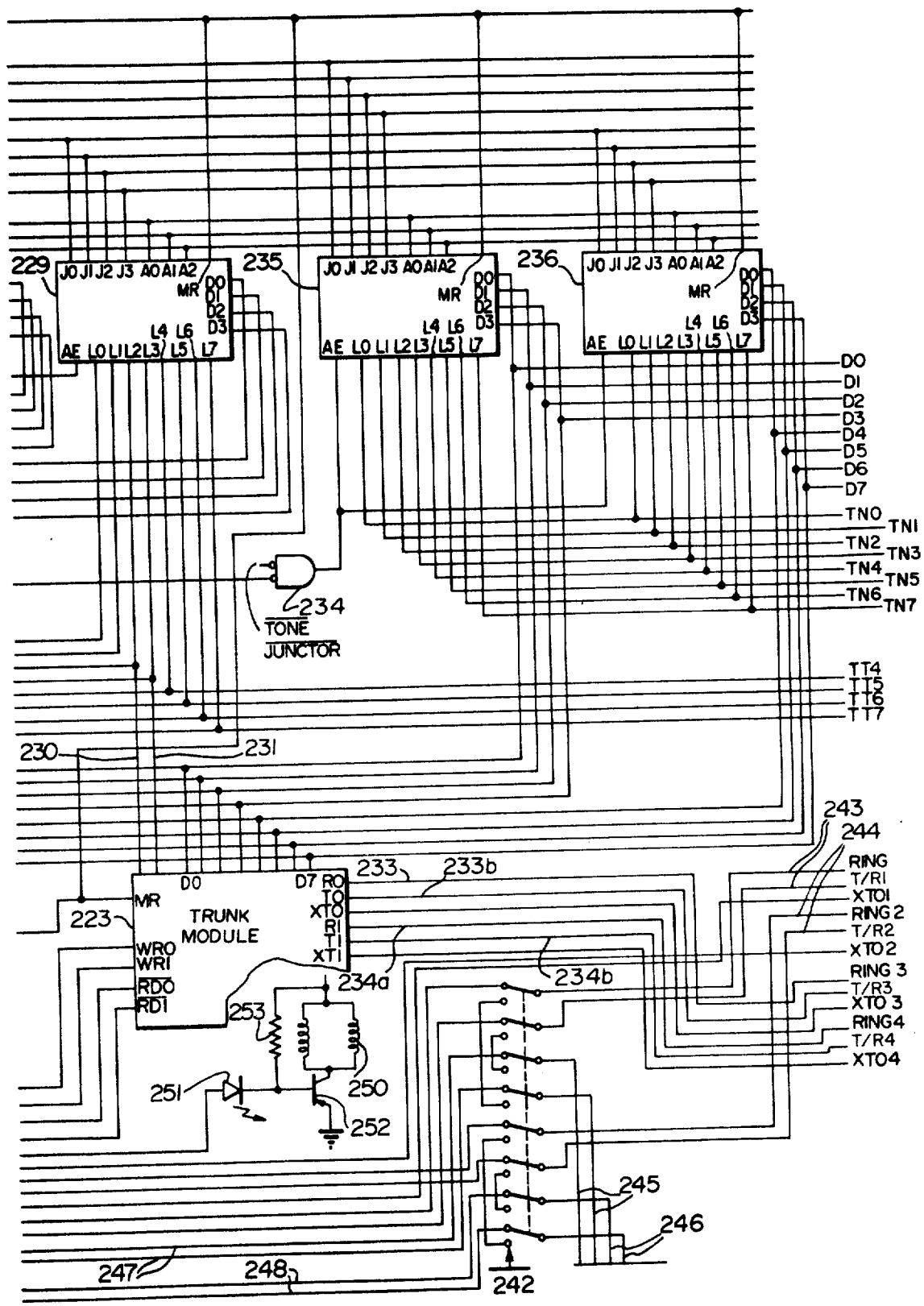
Figure 4:
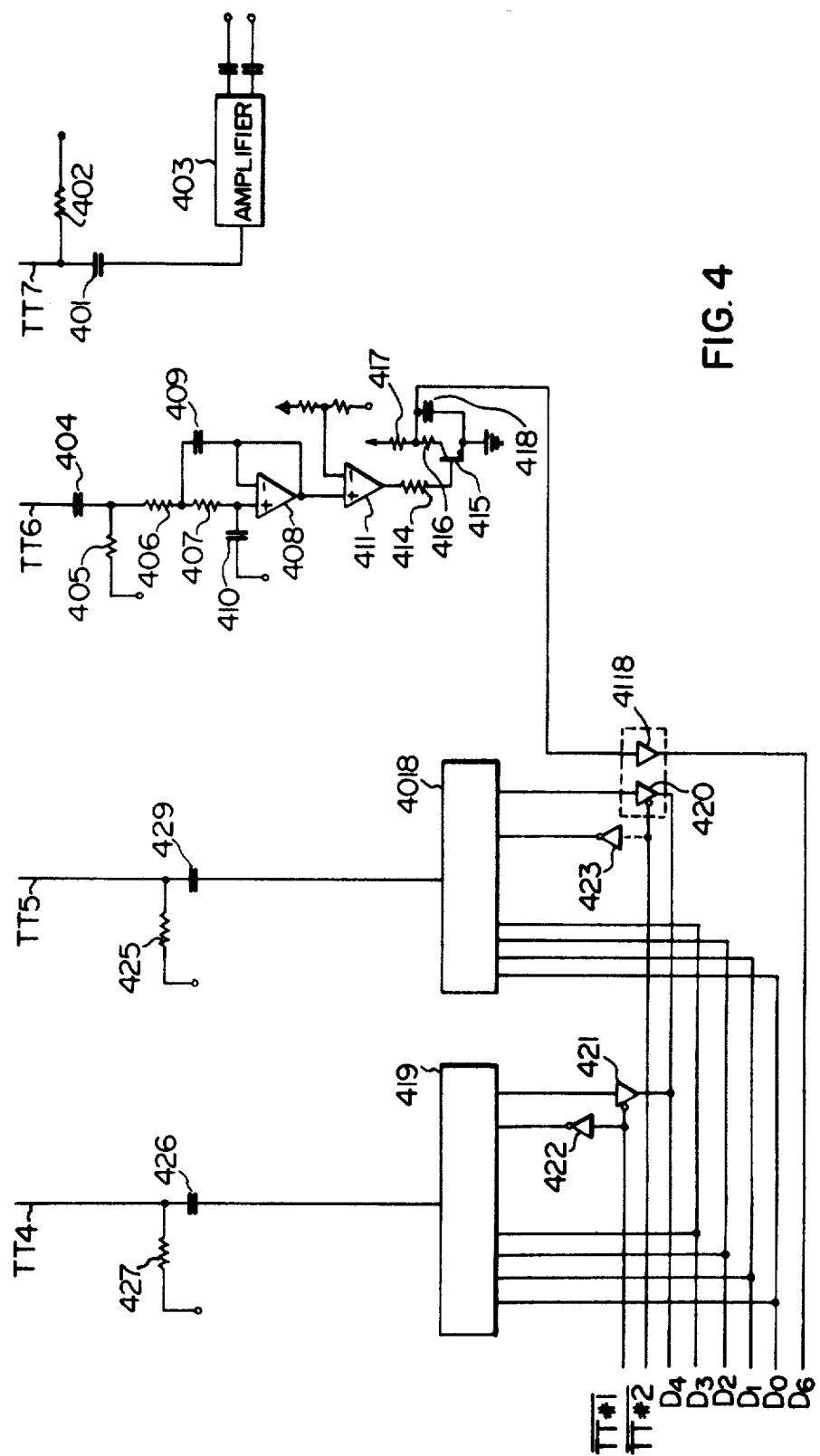
Figure 5A:
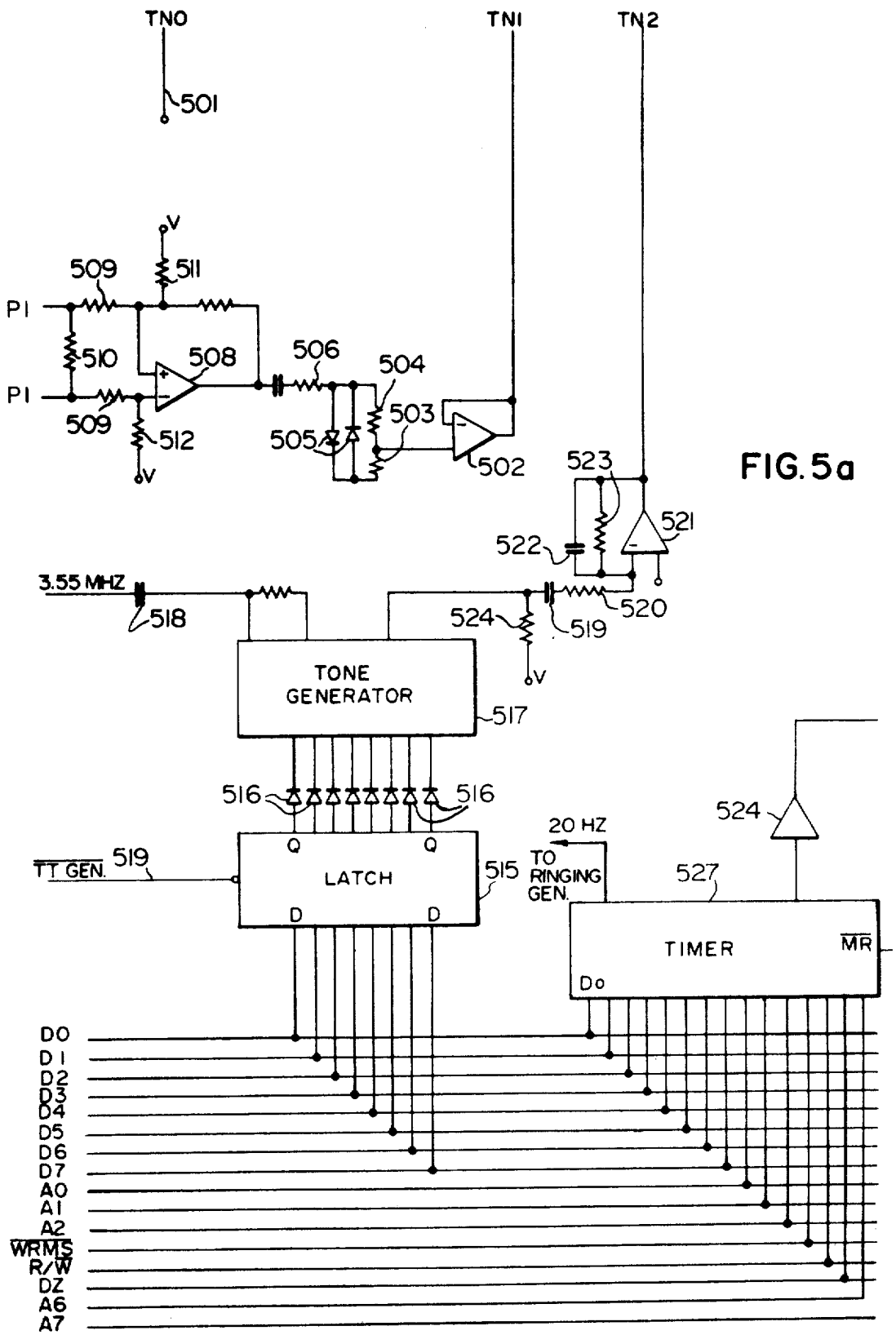
Figure 5B:
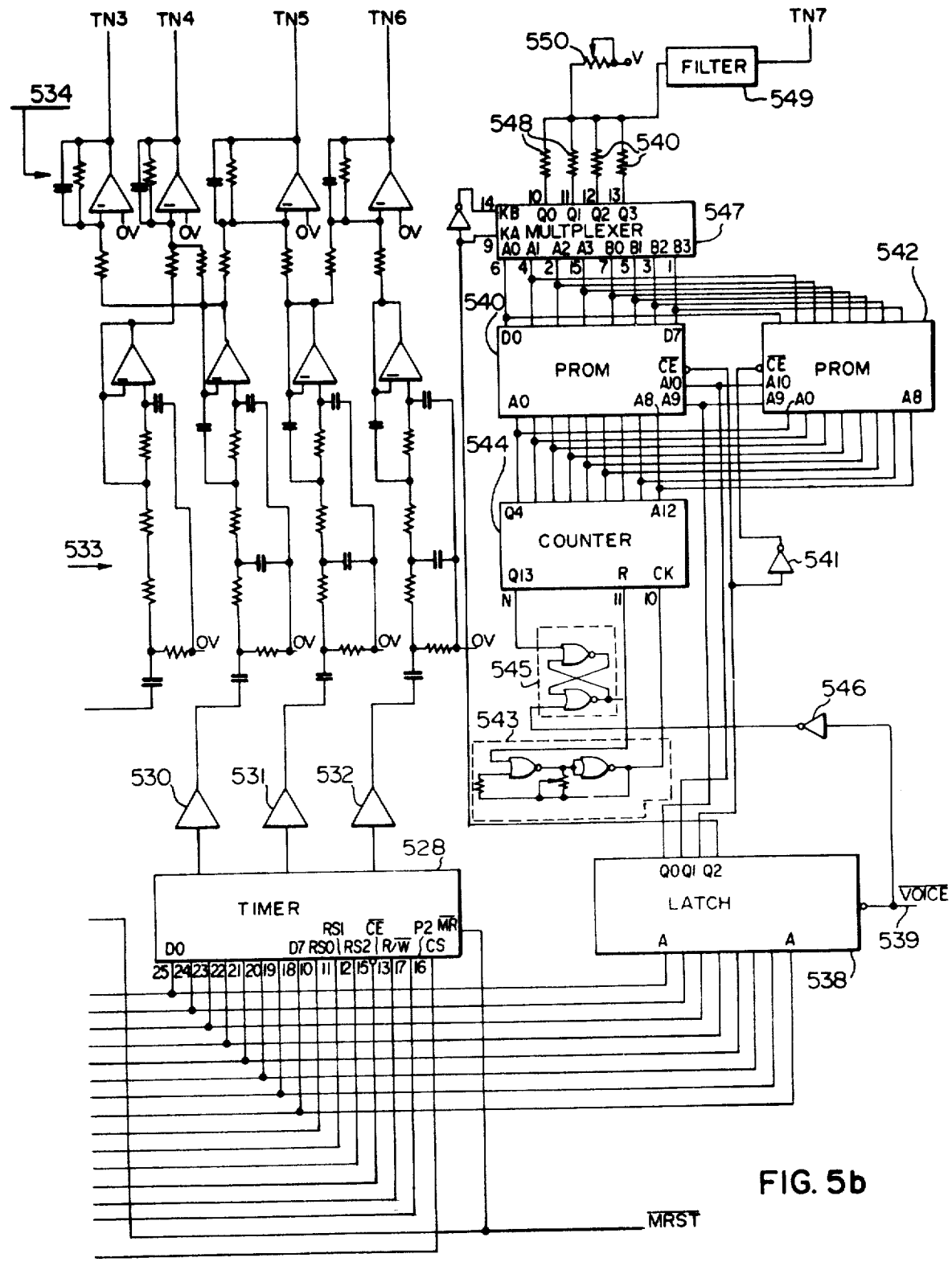

A better understanding of the invention will be obtained by reading the detailed description below, in conjunction with the following drawings, in which:

FIG. 1 is a block diagram of a telephone switching system according to the invention, FIGS. 2, 3a, 3b, 4, 5a, 5b, 6a, 6b and 7 are schematics of various parts of the invention, FIG. 3a to the left and FIG. 3b to the right thereof forming a single drawing and FIG. 5a to the left and FIG. 5b to the right thereof forming a single drawing.

Turning now to FIG. 1, a general block diagram of the preferred form of the invention is shown. The basic local telephone switching system is a stored program, microprocessor operated analog switching system, although a person skilled in the art understanding this invention would be able to utilize the principles in a digital system. In one successful prototype, the system was designed to handle a maximum of eight telephone station set extensions, and a maximum of four trunks.

A plurality of line circuits 1, to which extension telephone lines 2 are connected, are connected via a plurality of switches 3 to junctors 4. Similarly, a plurality of lines 5 which lead to a central office are connected to trunk circuits 6. The trunk circuits are connected via a plurality of switches 7 to junctors 4. Switches 3 and 7 are also connected to data bus 8 and address bus 9.

A pair of dialling signal receivers 10, such as multifrequency dialling signal receivers are also connected via switches 7 to junctor 4, as is dial tone receiver 11 and pager 12.

A plurality of call progress tone generators 13, for generating such tones as dial tone (350 and 440 hertz), ring back tone (440 and 480 hertz), busy tone (480 and 620 hertz), and error tone (440 hertz). A dialling signal (multifrequency) generator 14, a quiet tone generator 15, a music-on-hold source 16, and a voice synthesizer 17 are connected with the call progress tone generators 13 through switches 18 to junctor 4, switches 18 also being connected to the data bus 8 and address bus 9.

A UART 19 (Universal Asynchronous Receiver-Transmitter) is connected to the address and data buses. Also connected to the address and data buses is a microprocessor, comprising a central processing unit CPU20, memories PROM21 and RAM22, which are both connected to the address and data buses, and address decoder 23 which is connected to address bus 9 and to PROM21 and RAM22. A battery 24 is also connected to RAM22, to hold the memory contents during power-out conditions.

A ringing generator 25 is connected to line circuits 1.

In operation, an incoming call from a central office causes one of the lines 5, and a corresponding trunk circuit 6 to become busy. A data word is applied to data bus 8, which advises the CPU20 that an incoming call is being received. The CPU, after accessing an operation program stored in PROM 21 by appropriately addressing it in a well known manner, operates switch 3 and cuts through ringing generator 25 to apply ringing to the idle extension lines 2 (identification of the busy lines having been previously stored in RAM 22). Ringing current is thus applied to the extension telephone sets connected to extension lines 2.

When a rung telephone set has been answered, the CPU disconnects the ringing generator 25 from the extension lines, and interconnects the called extension line 2 and incoming line 5, through corresponding line circuit 1 and trunk circuit 6, switches 3 and 7, and junctor 4. The two parties may now carry on a conversation.

Assuming, however, that the call is intended for a different party, the answering party flashes his switchhook. This flash is detected by the CPU, which disconnects the trunk circuit from the junctor, causes trunk circuit 6 to place a hold termination on the incoming line, connects the junctor to which the answering line circuit was connected through one of switches 18 to voice synthesizer 17, and applies a signal from data bus 8 to enable voice synthesizer 17 to output a vocalized representation of the line 5 number corresponding to the incoming call. In addition, if the music-on-hold option is utilized, the microprocessor closes a switch 18 and a switch 7 which connects the incoming line through trunk circuit 6 to another junctor to which the music-on-hold circuit is connected, thus returning music to the calling line 5, while it is being held.

Similarly, if the option is utilized, a source of quiet tone (grounding) can be connected to the junctor in alternative to the music-on-hold source. This helps reduce cross-talk returned to the calling subcriber.

With the incoming line number returned via a junctor 4 to the answering party, he then calls another party to access the line. He can, if desired, access pager 12 by dialling a predetermined number such as, for example, "8". This tone is received by a dialling signal receiver 10, which is connected through switch 7 to junctor 4. The resulting signal is converted to a data word and applied to data bus 8, for reception by CPU20. CPU20 enables a switch 7, connecting a paging amplifier in pager 12 to the junctor 4 connected to subscriber's line 2 to which the local talking subscriber is connected. The local subscriber can now page the intended party to access the incoming line, and will, for example, say "Bill Smith, please take line 3." He then hangs up, and the CPU, detecting that the subscriber has hung up, disconnects switch 3 which previously connected his extension line 2 to junctor 4.

Bill Smith now removes his handset, resulting in the CPU detecting the off-hook condition, and thus connecting dialling signal receiver 10 through one of switches 7, a junctor 4, and switch 3, one of line circuits 1 to the extension line 2 to which the telephone set to which Bill Smith is connected.

Bill Smith now dials a digit 3 to access line 3. The dialling signal receiver, detecting this digit, applies a data word to data bus 8 which is detected by CPU20. CPU20 causes the junctor to which Bill Smith's line is connected, to be connected through one of switches 7, and a trunk circuit 6 to the incoming line 5. It of course also removes the dialling signal receiver from connection to the junctor 4, by reopening the switch 7 which completed the circuit path. Bill Smith and the calling party may now complete their conversation.

For initiating a call, a local subscriber lifts his handset, which is connected to one of the extension lines 2, connected to a line circuit 1. This is detected by the CPU, which closes one of switches 3, connecting the line circuit to a junctor 4. At the same time it closes one of switches 7 which is connected to a dialling signal receiver 10.

If the subscriber wishes to access any of the lines, he merely dials the line number, which typically will be a one digit number, after dialing a prefix number, such as 3. The CPU will then connect the line circuit to that particular line, whether it is busy or not.

If desired, if the subscriber wishes to access a line which is free, in order to initiate a call, he dials a prefix digit such as "9" (meaning "I want an outside line"), followed by the line number which he wishes to access. The dialling signal receiver recognizing the dialling signal, applies a data word to data bus 8, which generates an interrupt to CPU20, advising it of the line which the subscriber wishes to access.

If line 5 is busy, the CPU closes one of switches 18, which leads to the busy call progress tone source 13, applying the busy tone to the junctor 4 to which the calling subscriber's line is connected. He then hears the busy tone, recognizing that the line is in use.

The calling subscriber can continue attempting to access outgoing lines 5, hoping to eventually reach one which is idle.

However, preferably and according to a successful prototype, in order to obtain an indication of which line he can use, the subscriber need merely dial a prefix number such as 9. This is recognized by the CPU as originating from a line circuit which has dialed the outgoing call prefix number. The CPU then closes one of switches 18 leading to voice synthesizer 17, and enables the voice synthesizer to output via switch 18 to junctor 4 leading to extension line 2 a voiced signal of the number of an idle central office line 5, e.g. "line 2". Preferably this line is the lowest numbered idle line, but another idle line can be designated.

The subscriber, hearing what line is idle, need merely dial the number of the idle central office line, and the CPU connects the corresponding trunk circuit 6 from the idle central office line to the junctor 4 to which the calling subscriber's extension line is connected.

Dial tone from a central office is received on the idle line, and passes via the circuit just set up to the subscriber. However it is also monitored by dial tone receiver 11, having been connected via a switch 7 to the junctor 4 by CPU20. Upon reception of the dial tone, dial tone receiver 11 places a word on data bus 8, which is received by the CPU, and which disconnects all the common control equipment from the audio path since it now recognizes that the calling subscriber has accessed the central office via a line 5 which is recognized by the central office as being seized.

As noted earlier, when an incoming call is placed on hold, if the local switching system has the option, music from music-on-hold circuit 16 is switched via a switch 8, under control of the CPU, to the junctor leading to the held incoming line 5. In the alternative, the held line can be connected to a source of quiet tone 15 in a similar manner, which can be a source of D.C. voltage or ground, during the hold period, thus reducing the possibility of cross-talk to the held subscriber.

A plurality of timers 26 are also connected between the data and address buses and the call progress tones. These timers are the usual timers which control the on or off periods of the various tones.

In order to preserve data signals which are stored in RAM22, a nickel cadmium battery 24 is connected thereto for back up, in case of power failure. RAM22 stores the call in progress status information, such as which lines are busy, equipment status, classes of service, numbering system, etc. PROM21 stores the general operation programs for CPU20.

The signals of the present invention can also be monitored at a remote location, and indeed the circuit can be controlled and problems diagnosed therefrom by connection of a remote terminal (not shown) via UART19 to the data and address buses 8 and 9. As is well known the UART is a two-way communications module interfacing between a parallel data word bus system and a serial asynchronous bus.

If desired, of course, a remote display (not shown) can also be connected to the data and address buses for operation by CPU20, in order to provide an indication, if desired, which lines are in use, and can also be used in conjunction with the remote control terminal for diagnostic purposes. The remote control terminal can also be used to record traffic data, such as destination, duration, and line source of toll calls, if desired.

Since the microcomputer system, including microprocessor CPU20, PROM21, RAM22, address decoder 23 and associated data and address buses, and ancillary interconnection paths are well known to persons skilled in the art, and since the microprocessor used is a known component in this invention, interaction of the various parts of the microprocessor including software will not be described in detail herein.

Turning now to FIG. 2, a portion of the invention including the line circuits is shown. Eight subscribers' lines comprising tip and ring leads 201a and 201b are connected to corresponding subscriber line interface circuits (SLIC) 202. SLICs are well known modules, which interface line circuits and provide means for applying ringing, detecting an off-hook condition, audio signal routing/coupling, applying operating voltage for the telephone set connected thereto, etc. A SLIC which is suitable for use in this invention is part No. 9900673 available from Mitel Corporation.

While the tip and ring leads are balanced inputs, an unbalanced output signal from the SLIC is obtained as its J output lead, respective outputs from each of the 8 SLICs being on leads LJ0–LJ7.

Ninety volt, 20 hertz ringing signal from a standard ringing generator and a D.C. supply are applied to the SLIC in a manner well known to persons skilled in the art; a detailed description is believed to be redundant.

Each SLIC is addressed as follows. Leads of the address bus, A0, A1, A2 are applied to an 8 bit addressable latch 208. One the 8 outputs Q0–Q7 is applied to individual SLICs (the MUTE input).

Similarly 8 bit addressable latch 209 has its inputs connected to the address bus, and its 8 outputs connected to individual ringing enable inputs RC of the SLICs.

Data bus lead D5 is connected to the data input of latch 208, and data bus lead D6 is connected to the data input of latch 209.

A $\overline{\text{LINES}}$ and a $\overline{\text{WPLS}}$ input are each connected to inverting inputs of NAND gate 210, the output of which is connected to the WR inputs of latches 208 and 209.

The D6 input is intended to activate relay 206 driver in the SLIC, and input D5 activates the mute input.

Thus when the microcomputer writes to an address that activates the $\overline{\text{LINE}}$ lead, the least significant address bits select which line is being written to; and the D5 or D6 data inputs determine the state (i.e., mute is on when D5 is a 0). Accordingly to ring line 4, with mute on, a data word 40 is written to address 1004.

When the write cycle occurs, the $\overline{\text{LINE}}$ lead is driven low, the address pattern is set (i.e. a 2 equals 1, a 1 equals 0, a 0 equals 0), the data pattern is set (D6=1, D5=0), and the $\overline{\text{WPLS}}$ lead is strobed low. Accordingly the NAND gate 210 output goes low, entering the data and address into latch 208. This causes the RC input on SLIC#4 to go high, and the $\overline{\text{MUTE}}$ lead to go low.

The SLIC operates relay 206, applying ringing current to tip and ring 201a and 201b connected to the fourth SLIC.

When the called subscriber answers, the SLIC applies a low output to the $\overline{\text{OFHK}}$ lead, which is carried to one of the D0–D7 inputs of 8/1 multiplexer 211. The address inputs of multiplexer 211 are connected to the A0–A2 leads of the address bus. Multiplexer 211 is enabled from the microprocessor at its enable EN lead which is connected to the output of inverting NAND gate 218, which has its inputs connected to the $\overline{\text{LINES}}$ and R/W outputs of the microprocessor. Accordingly when multiplexer 211 is addressed via the address bus, and enabled via NAND gate 218, an output bit appears on the data bus lead D7, which is connected to the Z output lead of multiplexer 211.

When multiplexer 211 is enabled, data bus lead D6 is pulled low through diode 212. The latches 208 and 209 are reset via the MRST leads, connected to the MR inputs of both latches. The MRST lead can be part of the address bus, and goes to hi level, in order to initiate the reset, when the system is reset, such as on power on or when a printed circuit board is plugged in.

As an example of a request for service, when the telephone set connected to the tip and ring leads of SLIC#6 goes off hook, addressing 2006, multiplexer 211, provides a hexidecimal 3F data signal, designating that unit #6 is off hook. When the telephone set connected to SLIC#6 is on hook, the data would have been BF (in hexidecimal).

The addressable latches 208 and 209 can each be parts 4099 available from National Semiconductor Corporation, while the 8/1 multiplexer can be type 4512.

The audio lines LJ0–LJ7 from each of the SLICs are connected to switch array 213 and 214 in parallel (see FIG. 3). The outputs of each switch array are connected to individual four out of the eight junctors J0–J7. The particular switch closed in the crosspoint switch array is determined by the signals on leads D0–D3 of each of the crosspoint switch arrays 213–214, which 8 inputs are connected to leads DX0–DX7. The latter leads are connected to outputs Q0–Q7 of decoder 215. The address inputs A0, A1 and A2 of decoder 215 are connected to data bus leads D0, D1 and D2 of the system.

The crosspoint switch arrays 213 and 214 have their address inputs A0, A1 and A2 connected to the similarly referenced address bus leads.

The address enable AE input of each of the crosspoint switch arrays are connected to the output of inverting AND gate 216, which has its inputs connected to the $\overline{\text{WPLS}}$ lead and the $\overline{\text{LINE}}$ lead.

It may be seen that when the $\overline{\text{LINE}}$ and $\overline{\text{WPLS}}$ leads are low, a particular subscriber's line is selected, and the crosspoint switches 213 and 214 are enabled. With the receipt of an address word on the address bus, one of the two crosspoint switch arrays is selected, and the particular crosspoint switch which is closed is selected by reception of a word on the data input leads D0–D3. Accordingly one of the audio paths from a SLIC is connected via one of the leads LJ0–LJ7, through a crosspoint switch, to one of junctors J0–J7. The particular crosspoint switch which is closed is determined by reception of a word on data bus leads D0–D2, which is applied to decoder 215. Decoder 215 is enabled by a signal on the $\overline{\text{LINE}}$ lead or the $\overline{\text{TRUNK}}$ lead (the latter indicating that a trunk initiated request for service has been received), and a signal on the R/W lead from the microprocessor. The former two leads are connected to inverting inputs of NOR gate 217, which has its output connected to one input of NAND gate 218, together with the R/W input which is connected to a second input of NAND 218.

Preferably crosspoint switch arrays 213 and 214 are product types 8804, manufactured by Mitel Corporation. The crosspoint switches have their reset inputs MR connected to the reset line MRST, for reset with power up, as described earlier.

The four trunks are connected to trunk circuits, which are shown as 2-trunk modules 222 and 223. Each of these trunk modules contains a pair of trunk circuits, such as types manufactured by Mitel Corporation. The tip and ring leads of the trunk inputs for two trunks 204a and 204b (R0 and T0), and 205a and 205b (R1 and T1) lead to the central office; in the preferred embodiment there are four trunks, although different numbers of trunks can be used. While these leads are called trunks herein, they are in reality four individual lines connected to the central office, terminating in trunk circuits in the present telephone switching system. The outputs of trunks 204 and 205 appear on leads 226 and 227 which are connected to two analog inputs L1 and L2 of a crosspoint switch matrix 228. The output of crosspoint switch matrix 228 is connected to four of the junctors J0–J7. Leads 226 and 227 are also connected to the L0 and L1 inputs of a second crosspoint switch matrix 229, which has its four outputs connected to the second group of four junctors J4–J7. The trunks are connected to data bus leads D0–D7, on their inputs D0–D7. Each is also connected from its MR input to the reset line MRST. Trunk module 223 also has its two outputs from the two trunks contained therein connected to inputs L2 and L3 of both crosspoint switch matrices 228 and 229 via leads 230 and 231.

Four additional inputs of crosspoint switch matrices 228 and 229 are connected to individual peripheral units, leads TT4 and TT5 being connected to individual multifrequency dialing tone receivers, lead TT6 being connected to a dial tone receiver, and lead TT7 being connected to a paging amplifier. Accordingly it may be seen that any of these peripheral units can be connected by either of crosspoint switch matrices 228 and 229 to any of the junctors.

The crosspoint switch matrices 228 and 229 have their data inputs connected to data bus leads DX0-DX7, and their address inputs A0-A2 to the address bus, similar to crosspoint switch matrices 213 and 214.

The address enable AE inputs of crosspoint switch matrices 228 and 229 are connected to the output of inverting AND gate 232, the individual inputs of which are connected to the $\overline{\text{WPLS}}$ lead and the $\overline{\text{TRUNK}}$ lead. Accordingly these crosspoint switch matrices are enabled with a low signal on the $\overline{\text{TRUNK}}$ lead and the $\overline{\text{WPLS}}$ lead, from the microprocessor circuit.

While trunk module 222 has two trunks (or central office lines) connected thereto, trunk module 1 has a similar number, comprising tip and ring leads 233a and 233b, and 234a and 234b.

It should be noted that only four of the eight inputs of each of crosspoint switch matrices 228 and 229 are connected to outputs of trunk modules 222 and 223. The remaining four inputs of crosspoint switch matrices 228 and 229 are connected in parallel, and to sources of peripheral equipment; lead TT7 is connected to the input of a paging amplifier, lead TT6 is connected to the input of a dial tone receiver, and leads TT4 and TT5 are connected to the inputs of a pair of multifrequency dial signalling receivers. These peripherals will be described in more detail below. However it should be noted that each device can be connected to one junctor at a time, through either of the crosspoint switch matrices 228 and 229.

In order to accommodate a plurality of other peripheral modules, another pair of crosspoint switch matrices 235 and 236 are provided. These are connected to junctors J0-J7, the address bus comprising leads A0, A1 and A2, and the reset lead MRST, in a similar manner as crosspoint switch matrices 213, 214, 228 and 229. The data inputs D0-D3 of crosspoint switch matrix 235 are connected to data bus leads D0-D3, and the data bus inputs D0-D3 of crosspoint switch matrix 236 are connected to data bus leads D4-D7.

The line outputs L0-L7 of both crosspoints switch matrices 235 and 236 are connected in parallel, and are shown as leads TN0-TN7, which are connected to the output of various modules as follows. Lead TN0 is connected to a source of quiet tone (ground or a potential supply), lead TN1 to a music-on-hold source, lead TN2 to the output of a multifrequency signalling tone generator, leads TN3, TN4 and TN6 to the respective outputs of four call progress tone generators, and lead TN7 to the output of a voice synthesizer.

We therefore have 12 ports, 4 ports connected to the inputs of peripheral modules, and 8 ports to the outputs of other peripheral modules.

The address enable AE inputs of crosspoint switch matrices 235 and 236 are connected together, and to the output of inverting AND gate 237, one input of which is connected to the $\overline{\text{WPLS}}$ output of a microprocessor, and the other input of which is connected to the $\overline{\text{TONE JUNCTOR}}$ output of the microprocessor.

The read/write inputs of the various trunks (central office lines) are shown as the WR0 and WR1 inputs of trunk modules 222 and 223. These inputs of trunk module 222 are connected to the 0 and 1 outputs of address decoder 238, while the WR0 and WR1 inputs of trunk module 223 are connected to the 2 and 3 outputs of address decoder 238. The A and B inputs of address decoder 238 are connected to the A0 and A1 leads of the address bus, and the enable E input is connected to the output of inverting NAND gate 239, one input of which is connected to the $\overline{\text{TRUNK CONTROL}}$ lead and one input of which is connected to the $\overline{\text{WPLS}}$ leads from the microprocessor circuit.

The $\overline{\text{RD0}}$ and $\overline{\text{RD1}}$ inputs of trunk modules 222 and 223 are respectively connected to the 0-3 outputs of address decoder 240. The A and B inputs of address decoder 240 are connected in parallel with the A and B input of addrss decoder 238, and the enable E input is connected to the output of inverting NAND gate 241, one output of which is connected to the $\overline{\text{R/W}}$ lead from the microprocessor circuit, and the other of which is connected to the $\overline{\text{TRUNK CONTROL}}$ lead in parallel with the input of address decoder 239.

Decoders 238 and 240 preferably are types 4555 and 4556 respectively, available from Motorola, Inc.

In case of failure, it is desirable to connect central office trunks (lines) directly through to some subscriber sets, without going through the PBX apparatus. Accordingly the tip and ring leads 224a, 224b, 225a and 225b of the two trunks connected to trunk module 222 are connected through double-pole double-throw switches 242 to leads 243 of the trunk or line leading to the central office, and also to leads 244 of a similar trunk or line leading to the central office. When in the normal position, the double-pole double-throw switch connects the T0, R0, T1 and R1 inputs of the trunk modules to corresponding trunk leads 243 and 244 to the central office.

However when in the operated position, the switch contacts connect the trunks through to a pair of local telephones connected respectively to leads 245 and 246.

However in the normal position, the telephones connected to leads 245 and 246 are connected through to lead pairs 247 and 248, which are respectively connected to the first two subscriber line interface circuits on leads 201a and 201b. Leads 247 connect to leads 201a and 201b connected to the first subscriber line interface circuit 202, and leads 248 connect to leads 201a and 201b leading to the second subscriber line interface circuit 202 (FIG. 2).

Lead 249 connected to the CUT THROUGH output of the microprocessor circuit is connected to relay coil 250 (which may be duplicated and connected in parallel in order to accommodate a large number of relay contacts) is connected between a source of −24 volts, and ground, through the collector-emitter circuit of transistor 252. The base of transistor 252 is connected to lead 249 through light emitting diode 251. The base of transistor 252 is connected for bias through resistor 253 to the −24 volt source.

Switches 242 are the relay contacts of relay coil 250 and are operated thereby.

Accordingly, when diode 251 is inoperative, the base-emitter junction of transistor 252 is biased on, causing release of relay 250, cutting through two of the trunk circuits to two of the trunk modules 222 and the two telephone sets are connected through to the first two SLIC circuits. However when the CUT THROUGH lead 249 goes high, diode 251 operates, raising its cathode, and the base of transistor 252 to high level, cutting off current flow through its collector and relay 250. Switches 242 are thus in their normal position, and the trunks are connected through to telephone sets. Diode 251 is thus illuminated to show failure operation. With system power removed, cutthrough mode is the default state.

The peripheral units will now be described, starting with the four units connected to leads TT4–TT7.

Turning now to FIG. 4, the lead TT7 is connected to a pair of amplifiers through isolation capacitor 401. A termination resistor 402 is connected between the TT7 lead and ground or source of potential, in order to provide a proper termination for the switching matrix lead connected thereto. Typically this resistor can be 604 ohms.

Capacitor 401 is connected to a pair of power operational amplifiers, biased at −12 V each with a variable resistor, to adjust the gain. The amplifier outputs are in opposite phase, so that a speaker can be connected between them for maximum power. The outputs are capacitively coupled so that a speaker can be connected between each and ground, when the amplifier halves are used separately. Since paging amplifiers are known, paging amplifier 403 will not be described in detail.

The dial tone receiver is connected to lead TT6. Lead TT6 is connected through a capacitor 404, bypassed with resistor 405 to ground or source of potential, and is connected to the input of a 500 hertz low pass filter including resistors 406 and 407 in series to the non-inverting input of operational amplifier 408, capacitor 409 connected between the junction of resistors 406 and 407 to the inverting input, capacitor 410 between the non-inverting input and source of potential or ground. The inverting input is connected to the output of operational amplifier 408, and to the non-inverting input of operational amplifier 411. Operational amplifier 411 has its inverting input connected to the junction between a pair of resistors 412 and 413 which are connected between a source of potential and ground, thus forming with operational amplifier 411 a threshold detector, successfully tested as 30 millivolts.

The output of operational amplifier 411 is connected through resistor 414 to the base of transistor 415, which forms part of an integrator. The collector of transistor 415 is connected through a pair of resistors 416 and 417 to a source of potential, its junction is connected through integrating capacitor 418 to ground, and its junction is also connected to the input of buffer amplifier 418 to data bus lead D6.

In operation, the dial tone receiver, low pass filters, dial tone signals, detects those signals above a 30 millivolt threshold, to eliminate noise, integrates the output and applies to data bus lead D6.

The two dialling ton multifrequency receivers are respectively connected to leads TT4 and TT5, one detects low tone, and one detects high tone signals. Each receiver is comprised of a tone detector type 8865 and encoder, type 8860, both available from Mitel Corporation. A tone decoder of a type suitable for use is also described in U.S. Pat. No. 4,273,956 issued June 16, 1981, entitled TONE DECODER, invented by Michael C. J. Cowpland and Patrick R. Beirne.

The output of multifrequency signalling receivers 418 and 419 are connected to data bus leads D0–D3 in parallel. The STD outputs are connected through tri-state gates 420 and 421 respectively to data bus lead D7. Lead TT1 is connected to the TOE (Tristate Output Enable) input of receiver 419 through inverting buffer 422, the TT#1 lead also being connected to the enable input of tri-state gate 421. The TT2 is similarly connected to the TOE input of multifrequency signalling receiver 418 through inverting buffer 423, as well as the enable input of tri-state gate 420.

The TT5 lead is connected to the input of receiver 418 through capacitor 424, bypassed by resistor 425. Similarly lead TT4 is connected to the input of receiver 419 through capacitor 426, and is bypassed by resistor 427 to ground or a source of potential.

Turning now to FIGS. 5a and 5b, the peripheral units having outputs for connection to the junctors are shown.

The quiet tone port on lead TN0 is connected via lead 501 to a source of 0 volts. This is used between dialled digits, for example.

The music-on-hold port on lead TN1 is connected to the output of amplifier 502, the input of which is connected to potentiometer 503 which is in series with resistor 504. A pair of oppositely connected diodes 505 is connected across the resistor potentiometers combination, one side of which is connected to 0 volts, and the other side of which is connected via resistor 506 in series with capacitor 507 to the output of differential amplifier 508 to limit the energy applied into lead TN1. The inputs of amplifier 508 are connected through 100K build out resistors 509 to input leads P1, the source of music. A 600 ohm resistor 510 is connected across the P1 leads in order to provide a 600 ohm input resistance. The inverting input of amplifier 508 is connected through resistor 511 to a source of potential at 0 volts, and the non-inverting input is connected through resistor 512 to a source of 0 volts.

The input signal therefore sees a 600 ohm input resistance, which is translated through differential amplifier 508 and is applied to diodes 505. Diodes 505 limit the signal to 1.4 volts peak to peak (−4 dBm), then attenuates to at least −9 dBm; the actual value is set by potentiometer 503. The signal is then passed through amplifier 509 having unity gain, and is applied to lead TN1 for application to one or more junctors.

The multifrequency output signals are generated as follows. A latch 515 has its 8 inputs connected to data bus leads D0–D7, and its outputs through diodes 516 to the 8 inputs of multifrequency tone generator 517. Latch 515 can be type 374, and tone generator 517 type 2559, available from Mitel Corporation. A 3.58 megahertz clock signal from a crystal oscillator is applied through a small capacitor 518 to tone generator 517. The latch 515 is strobed from lead 519, labelled $\overline{\text{TTGEN}}$, from the microprocessor circuit.

The output of tone generator 517 is applied via capacitor 519 and resistor 520 in series to the inverting input of operational amplifier 521. The latter input of amplifier 521 has capacitor 522 in parallel with resistor 523 connected to its output, which lead is the TN2 tone generator output described earlier with reference to FIG. 3. The output of tone generator 517 is also by-passed to 0 volts by resistor 524.

The tone generator latch holds 8 bits from the data bus when strobed by a signal on $\overline{\text{TTGEN}}$ (address 1020). These 8 bits select the tones from the tone generator chip, which are then A.C. coupled, amplified, and smoothed.

As noted earlier, there are four "call progress" tones: dial tone: 350 and 440 hertz sinewaves added at −13 dBm each; ring back: 440 and 480 hertz sinewaves added at −19 dBm each; busy tone: 480 and 620 hertz sinewaves added at −24 dBm each; and error tone: 440 sinewaves at −20 dBm.

These signals originate at a pair of timers 527 and 528. The timers have their D0–D7 inputs connected to the similarly labelled data bus leads, its RS0, RS1 and RS2 leads are connected to address bus leads A0, A1 and A2 respectively, their chip enable $\overline{CE}$ connected to the CE bus, their R/W leads to the R/W bus, its P2 connected to the P2 bus, and their respective chip select CS leads individually connected to address bus leads A6 and A7. Their $\overline{MR}$ inputs are connected together to the $\overline{MRST}$ lead, for receiving reset pulses.

One output of timer 527 provides 20 hertz squarewaves for application to the ringing generator (not shown). An output applied through buffer 529 provides 350 hertz squarewaves, an output of timer 528 connected through buffer 530 provides 440 hertz signals, an output through buffer 531 provides 480 hertz squarewaves, and an output provided through buffer 532 provides 620 hertz sinewaves. The frequencies are of course selected to meet local requirements.

These signals are filtered by third order lowpass filters 533, are added as shown and smoothed in smoothing circuits 534, the outputs of which are applied to leads TN3, TN4, TN5 and TN6. Filters 533 and smoothing circuits 534 are of conventional construction and need not be described further.

The timer circuits are integrated circuit chips type 6840, available from Motorola, Inc., and addressed preferably with addresses 1070–1077 and 10B0–10B7. The squarewave outputs (other than the 20 hertz signal) are applied through buffers 529–532 (preferably type 4049) to buffer them to 5 volts peak to peak. The signals are then A.C. coupled to about 0 volts, and then filtered by third ordered low pass filters. The resulting sinewaves are added and smoothed to produce the four call progress tones.

The output of the voice synthesizer is on lead TN7, and will be described in more detail below. However, it should be noted that the crosspoint matrices for the peripheral circuits, being connected to the address bus, can be address selected by the port number. For instance address 1018 selects quiet tone, 1019 selects music-on-hold, etc. The data bus connects a port to the system junctor, i.e., writing a 02 (pattern: 0000 0010) connects a port to the second system junctor. Writing a 08 (pattern: 0000 1000) connects a port to the fourth junctor. Thus ports may be connected to more than one junctor at a time (e.g. a pattern: 0000 1010) connects the addressed input to both the second and the fourth junctor. Accordingly it is preferred, for multiple "boardcast" operation, a 604 ohm termination resistor should be included on the TNX lead.

The crosspoint switch matrices are written when $\overline{TONEJUNC}$ and $\overline{WPLS}$ are both low (address 1018 to 101F).

The voice announcement unit, shown in FIG. 1 as voice synthesizer 17 can be any known device for selectively applying an announcement to the TN7 lead, such as analog recoded magnetic tape loops, etc. However it is preferred that a voice synthesizer should be used, whereby the use of mechanical apparatus which is subject to breakdown and service is minimized.

While other voice synthesizers could be used, a voice synthesizer suitable for use in this invention will be described below. The line number which is to be announced is addressed by a word applied by the microprocessor to data bus leads D0–D7. This is applied to latch 538, which holds the signal upon reception of a signal on the VOICE lead 539 from the microprocessor circuit. The latch 538 decodes the signal; only 3 bits on outputs Q0, Q1 and Q2 are required. Outputs Q0 and Q1 are applied to the A9 and A10 address inputs of a pair of programmable PROM memories, each capable of holding 16,000 bits, for a total of 32,000 bits.

Output Q2 of latch 538 is applied to the chip enable CE input of PROM540, and after inversion in inverting buffer 541, to the similar input of PROM542.

The contents of the PROMs are divided into cells; with the 3 bit select just described, 8 cells can be selected out of a total of 32,000 bits of memory, 4000 bits per cell being allocated.

Assuming that the words "line", "one", "two", "three", and "four", are to be stored, and scanned at 16,000 bits per second, the word "line" has been found to utilize ¼ second of time, or 4000 bits (¼ PROM). Each of the line number words has been found to utilize ¼ second of time, or 4000 bits, at the 16,000 bit per second scan rate.

The PROMs are scanned by sequentially addressing, the address starting from a predetermined number which is at the beginning of the first cell which stores the digitized word "line". Following completion of the word, the address shifts to the location specified by the data output Q0–Q2 of latch 538, to select further scanning of the word designating the line number.

The addresses are generated by means of oscillator 543 outputting clock pulses to a counter 544. The counter begins counting at predesignated address number, outputting pulse waveforms at counter outputs Q4–Q12. These outputs are connected to the address inputs A0–A8 of PROMs 540 and 542 in parallel.

Once the counter 544 output count has reached a count which outputs a signal on output Q13, flip flop 545 is enabled. This applies a signal to reset input R of counter 544. The same signal is applied to an input of oscillator 543, which inhibits operation of oscillator 543.

The output of flip flop 545 goes to high level upon receipt of a signal on the $\overline{VOICE}$ lead 539, inverted in inverting buffer 546. Accordingly when an enable signal appears on lead 539, enabling decoder 538 to accept a line designation data signal from the data bus leads D0–D7, it also resets flip flop 545, which, while releasing the reset input on counter 544, also enables operation of oscillator 543. Counter 544 begins counting, addresses sequentially designated addresses of PROMs 540 and 542 to output the word "line". When the address location reaches the end of the word "line", the address jumps to the decoded address locations of decoder 538, which designates the line number such as "1", "2", etc. The digitized words are output from PROMs 540 and 542 on their paralleled output leads.

When the count from counter 544 has reached output Q13, this signal is applied to flip flop 545, which both resets counter 544 and inhibits further operation of oscillator 543.

The digitized output signals of PROMs 540 and 542 are applied to multiplexer 547, which is an eight to four multiplexer. The four outputs Q0–Q3 of multiplexer 547 are connected together through resistors 548, and via a low pass 1¼ khz filter 549 to output lead TN7. The output level can be selected by shunt potentiometer 550. Resistors 548 form a 4 bit D/A converter.

The digitized output signal is thus multiplexed together, filtered to remove most of the high frequency components, and is applied to the lead TN7 for application to the junctor via crosspoint switch matrix 235, as described earlier.

It is preferred that the PROMs should be type 2716, which is available from Intel Corporation. This PROM has the capacity of 16,384 bits, and of course should it be desired to utilize more of the capacity thereof to increase the verbalization capability of the voice synthesizer, this can be effected as desired.

Figure 6A:
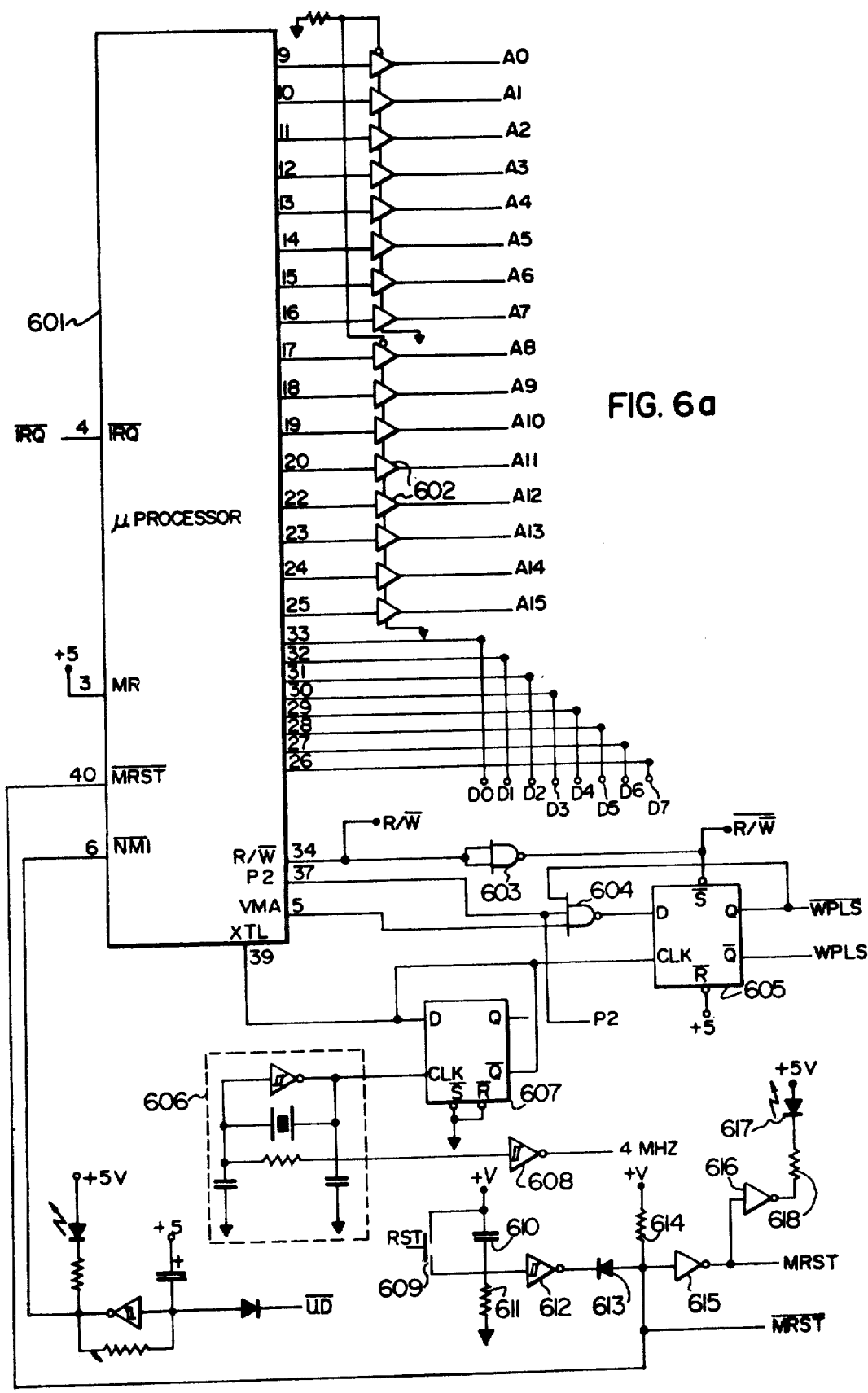
Figure 6B:
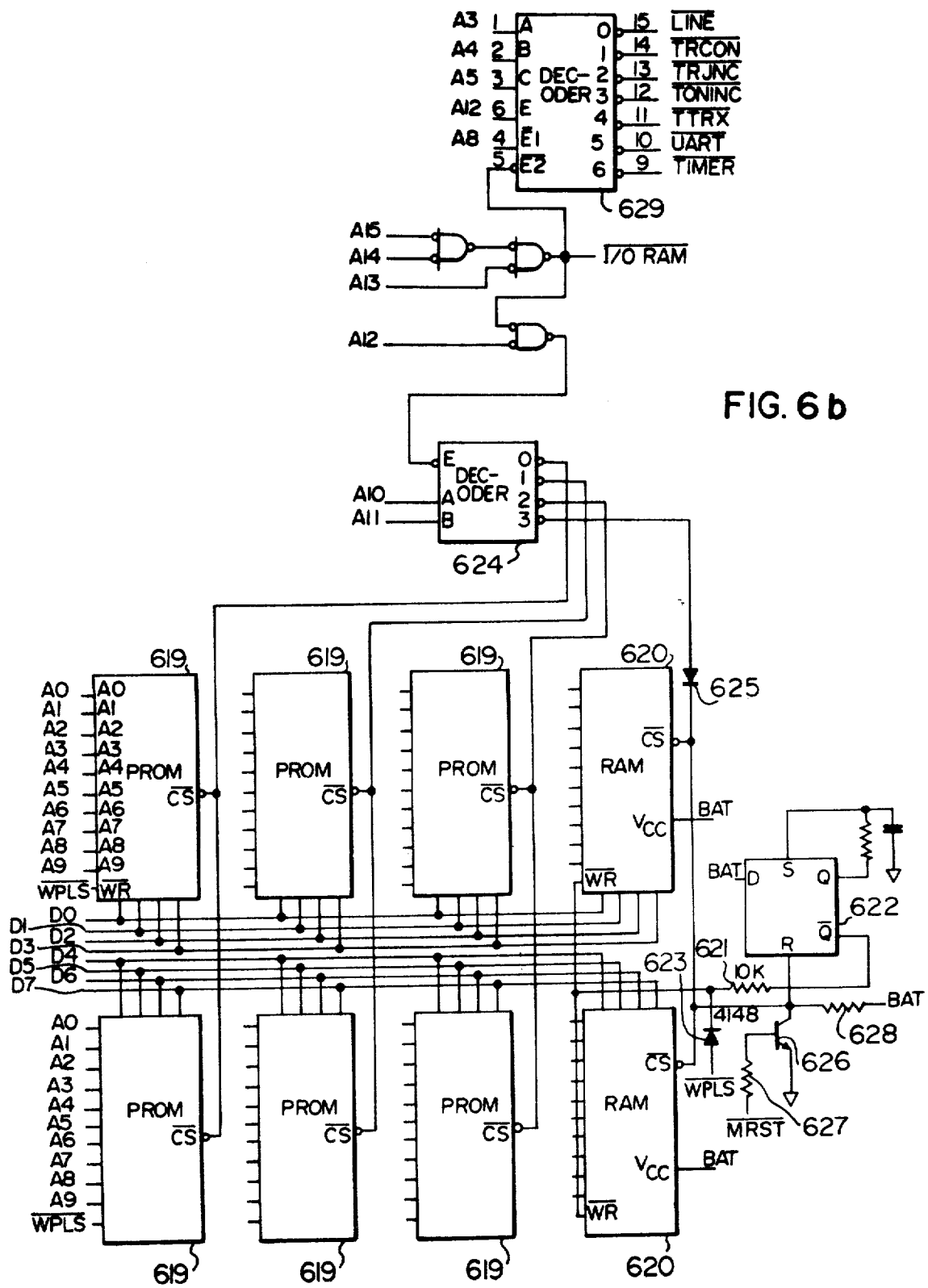
Figure 7:
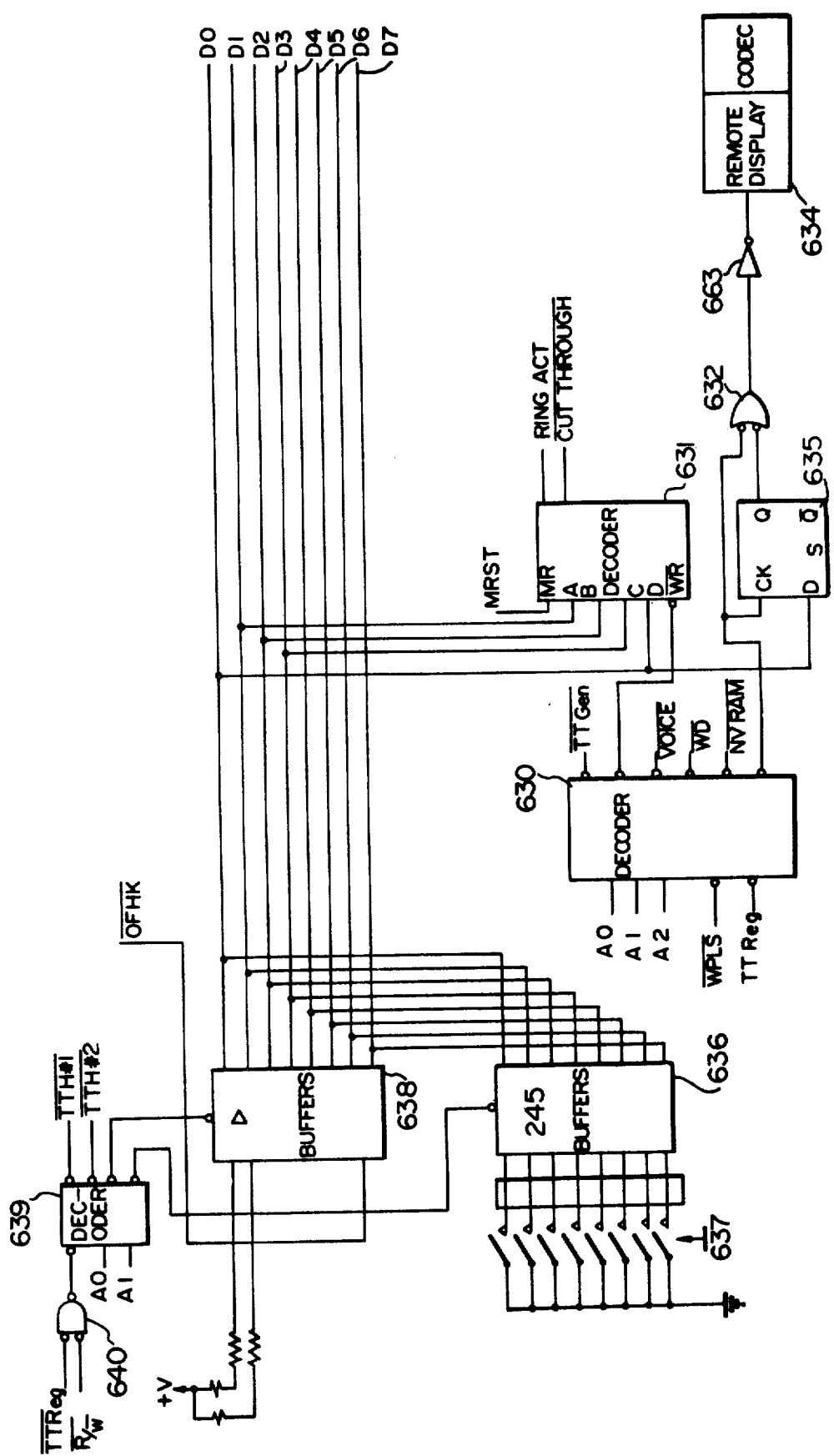

FIGS. 6a and 6b form a schematic of the microcomputer preferred to be used in this invention. The basic microprocessor 601 is preferred to be type 6802, which is available from Motorola Inc. of the United States. The address bus, leads A0–A15 are connected to the microprocessor via switched buffers 602, which are preferred to be type 74C245, the equivalent being available from National Semiconductor Incorporated. The read/write output is connected via inverting buffer 603 to a R/W lead used in the circuit as described earlier. In addition, the phase two P2 output, and VMA output are both connected to corresponding inputs of NAND gate 604 to the data D input of flip flop 605. The Q output forms a $\overline{WPLS}$ lead used elsewhere in the apparatus, which lead is connected to a further input of NAND gate 604. The R/W lead is connected to a S input of flip flop 605. Preferably flip flop 605 is type 74LS74, available from Texas Instruments, Inc. Its $\overline{Q}$ output forms the WPLS lead.

A crystal oscillator circuit 606, preferably at 4 megahertz has its output connected to the clock input of a further flip flop 607, of the same type as flip flop 605. Its Q output is connected to the clock input of flip flop 605, to the crystal input of microprocessor 601 and to its own data input. Flip flop 607 thus forms a divider.

A further output of oscillator 606 is connected through Schmidt trigger 608 to a UART lead, for clocking an UART (if used). A manual switch 609, for resetting the circuit, is connected from a source of potential +V, across capacitor 610, through resistor 611 to ground. The junction of capacitor 610 and resistor 611 is connected through a Schmidt trigger 612, diode 613 to the $\overline{MRST}$ input of the microprocessor, and to a source of voltage +V through resistor 614. The $\overline{MRST}$ input is also connected to an inverting buffer 615 to the MRST lead, and through a further inverting buffer 616 to a light emitting diode 617 through resistor 618. It will thus be seen that upon depression of manual switch 609, capacitor 610 is discharged, and upon release it charges, going to low level for a short period, applying a low level input to the $\overline{MRST}$ input of microprocessor 601, and applying a pulse to the reset lead MRST. At the same time light emitting diode 617 illuminates, indicating that a reset is occurring.

A plurality of outputs of microprocessor 601 further forms the data bus, having leads D0–D7.

A plurality of PROM memories 619 are connected to the address bus leads A0–A9, the data bus leads D0–D7 and the $\overline{WPLS}$ lead. Further, a pair of random access memories RAM620 are also connected to the address and data buses. The W/R inputs are connected together, and through resistor 621 to the $\overline{Q}$ output of flip flop 622. The $\overline{WPLS}$ lead is connected through diode 623 to the W/R inputs of RAMs 620. The data D input of flip flop 622 is connected to a battery high lead, i.e. a nickel cadmium security battery which is also connected to the voltage input leads of RAMs 620. Accordingly data signals stored in the RAMs will not be lost in a power out condition. The LLK input of flip flop 622 is connected to a $\overline{NV\ RAM}$ lead, which goes to high level from a power supply (not shown) in a main power supply off condition.

The PROMs are chip selected in pairs, each pair being connected to all eight of the data bus leads. The CS inputs of each pair of PROMs are connected to individual outputs of decoder 624, its two inputs being connected to address bus leads A10 and A11. The fourth output of decoder 624 is connected through diode 625 to the chip select CS inputs of RAMs 620. The chip select inputs of RAMs 620 are also connected to the reset input of flip flop 622. This lead is also connected to the collector of transistor 626, the emitter of which is connected to ground and the base of which is connected to resistor 627 to the $\overline{MRST}$ lead. The output of transistor 626 is connected through resistor 628 to the battery lead BAT.

Accordingly when the circuit is to be reset, the $\overline{MRST}$ lead goes high, operating transistor 626, bringing its collector to ground, and applying a low level reset to flip flop 622 and to the chip select inputs of RAMs 620. The enable lead of flip flop 624 is connected via a logic circuit operated by a signal carried on various address leads A12–A15, which logic circuit also enables decoder 629 to apply signals on a plurality of enable leads as a result of decoding from various address bus leads.

A further decoder 630 is connected to address bus leads A0, A1 and A2, the $\overline{WPLS}$ lead and TTRec leads. The outputs of decoder 630 are connected to the $\overline{TTGEN}$, $\overline{VOICE}$, WD, and NVRAM leads, all being enable leads as described earlier. A further output leads to the W/R input of decoder 631, and a still further output is connected to one inverting input of NOR gate 632. The output of NOR gate 632 is connected through inverting buffer 663 to a remote display 634 (if used), a CODEC, etc. The latter units are of course optional.

The second input of NOR gate 632 is connected to the Q output of flip flop 635, which has its data input connected to the D0 data bus lead, and its clock input connected to the output of decoder 630 leading to the other input of NOR gate 632. The Q output of flip flop 632 is connected to the set S input via a resetting circuit, which provides a clocking function for NOR gate 632.

Further data bus leads D0–D4 are connected to inputs of decoder 631, along with the MRST lead being connected to the reset MR input thereof. Outputs of decoder 631 are applied to a ring actuation output RINGACT, and through a $\overline{CUT\ THROUGH}$ output, the latter being described with reference to FIG. 3.

Data bus leads D0–D7 are also connected through buffer array 636, which connects each lead through individual manually operated switches 637 to ground, whereupon any of the data bus leads can be connected to ground.

A further plurality of buffers 638 have their outputs connected to data bus leads D0–D7, and a pair of inputs connected through isolating resistors to a source of high level potential. The buffers 636 and 638 are enabled from decoder 639, a further pair of outputs forming the TT1 and TT2 leads, described earlier. The inputs of decoder 639 are connected to the A0 and A1 address leads, the via inverting NAND gate 640 to the $\overline{TTRG}$ and R/W leads.

A person skilled in the art understanding the description of the invention given with reference to FIG. 1, and understanding the operation of microprocessor controlled PABXs, and having the description of the details of the present PABX above, will immediately understand the operation thereof including the programming required therefore. As operation with the voice synthesizer has been described in detail above, it is believed within the expected skill of a person skilled in the art to derive the specific programming steps which would be used with the microprocessor; as the specific mode of operation can be optimized in various ways, a specific listing of the program steps is believed to be redundant.

A person skilled in the art understanding this invention may now conceive of various alternative structures, variations and other embodiments, using the principles of the invention described above. All are considered within the sphere and scope of the invention as defined in the claims appended hereto.

The embodiments of the invention in which an exclusive property or privilege is claimed are defined as follows:

1. A telephone switching system comprising:
   (a) a control system,
   (b) means for connecting a plurality of subscribers' lines to the control system,
   (c) means for connecting a plurality of trunk circuits to the control system,
   (d) a set of junctors for interconnecting lines and trunks under control of the control system,
   (e) a voice announcement system connected to the control system,
   (f) the control system including means for breaking an existing voice circuit path between an off-hook subscriber line and a trunk and for holding the trunk busy upon reception of a predetermined command signal from the line, and
   (g) means for connecting the voice announcement system to a junctor connected to said line upon reception by the control system of said command signal from said line and for enabling the generation of a predetermined announcement signal constituted by a voiced designation of a number of the trunk being held busy, for application to said line.

2. A telephone switching system as defined in claim 1, in which the control system further includes means for connecting at least one of said lines to the designated trunk upon reception of predetermined signals from any of said lines.

3. A telephone switching system as defined in claim 2 in which the command signal is one of a hookswitch flash and a hookswitch flash followed by a predetermined dialled digit.

4. A telephone switching system as defined in claim 3 in which the predetermined signals are the number of the announced trunk received from any of said lines, following a predetermined prefix number.

5. A telephone switching system as defined in claim 1, in which the control system is adapted to enable the voice announcement system to generate an announcement signal constituting a voiced designation of an idle trunk and apply it to a junctor connected to any offhook subscriber's line upon reception of a first predetermined dialed digit received from said offhook subscriber's line, the enabled announcement signal designating the number of an idle trunk.

6. A telephone switching system as defined in claim 2 or 5, in which the control system is adapted to apply a busy signal to said offhook subscriber's line in the event of reception by the control system of a signal signifying a trunk number, without a prefix number, when the trunk is busy.

7. A telephone switching system as defined in claim 1 or 5, in which the voice announcement system is a voice synthesizer adapted to generate voiced trunk numbers upon being enabled by the control system.

8. A telephone switching system comprising:
   (a) a control system,
   (b) means for connecting a plurality of subscribers'-line circuits to the control system,
   (c) means for connecting a plurality of trunk circuits to the control system,
   (d) a set of junctors for interconnecting lines and trunks under control of the control system,
   (e) means for indicating to an accessing subscriber that a specific trunk is being held, and
   (f) means for interconnecting a line to said held designated trunk via a junctor and for releasing the held condition of said trunk upon receipt by the control system of a dialling signal from the line formed of a predetermined digit specifically designative of said held trunk.

9. A telephone switching system comprising:
   (a) a control system,
   (b) means for connecting a plurality of subscribers' line circuits to the control system,
   (c) means for connecting a plurality of trunk circuits to the control system,
   (d) a set of junctors for interconnecting lines and trunks under control of the control system,
   (e) means for connecting a calling trunk to an idle line via an idle junctor to establish a talking path,
   (f) means for opening said talking path and holding the calling trunk busy, upon reception of a predetermined signal from said line, and
   (g) a voice announcement system, and means for connecting the voice announcement system to said line upon said talking path being opened and said trunk being held busy, and for enabling the voice announcement system to return a voiced designation of which trunk is held busy to said line.

10. A telephone switching system comprising:
    (a) a control system,
    (b) means for connecting a plurality of subscribers' line circuits to the control system,
    (c) means for connecting a plurality of trunk circuits to the control system,
    (d) a set of junctors for interconnecting lines and trunks under control of the control system,
    (e) means for indicating to an accessing subscriber that a specific trunk is being held, and
    (f) means for establishing a voice path from a line to said trunk via a junctor upon reception of a dialling signal from the line, of a predetermined prefix digit followed by a digit designation of said trunk.

11. A telephone switching system comprising:
    (a) a plurality of line circuits,
    (b) a plurality of trunk circuits,
    (c) a plurality of junctors for interconnecting the line and trunk circuits,
    (d) a bus system,
    (e) a plurality of switches connected between the line circuits and the junctors and the trunk circuits and the junctors, and also connected to the bus system,
    (f) at least one dailling signal receiver connected via certain ones of said switches to the junctors, and also connected to the bus system,
    (g) a control circuit connected to the bus system for operating said switches and interconnecting at least one line and a designated trunk to establish a talking path, upon detection by said receiver of a predetermined prefix digit followed by a digit designative of said trunk from said line, said control circuit being adapted to split said talking path and hold said trunk busy, to connect said receiver to said line via a junctor responsive to a detection by the control circuit of a hookswitch flash from said line, and
(h) a voice synthesizer, the control circuit being adapted to connect the voice synthesizer to said line and to enable the generation and application to said line of a voiced designation of the number of said held trunk upon reception by said receiver of a predetermined dialled digit from said line.

* * * * *